(12) United States Patent
Woodall

(10) Patent No.: US 7,646,436 B1
(45) Date of Patent: Jan. 12, 2010

(54) FUZZY LOGIC BASED ADAPTIVE Y/C SEPARATION SYSTEM AND METHOD

(75) Inventor: Neil D. Woodall, Newport Beach, CA (US)

(73) Assignee: Pixelworks, Inc., Tualatin, OR (US)

( * ) Notice: Subject to any disclaimer, the term of this patent is extended or adjusted under 35 U.S.C. 154(b) by 0 days.

(21) Appl. No.: 12/194,382

(22) Filed: Aug. 19, 2008

Related U.S. Application Data

(63) Continuation of application No. 11/031,310, filed on Jan. 5, 2005, now Pat. No. 7,420,625, and a continuation-in-part of application No. 10/833,979, filed on Apr. 27, 2004, now Pat. No. 7,304,688.

(60) Provisional application No. 60/472,280, filed on May 20, 2003.

(51) Int. Cl.
 *H04N 9/78* (2006.01)
(52) U.S. Cl. .................................. 348/668; 348/667
(58) Field of Classification Search ......... 348/663–670, 348/624, 627, 630; 706/5, 8, 932; 382/155, 382/159
See application file for complete search history.

(56) References Cited

U.S. PATENT DOCUMENTS

| | | | |
|---|---|---|---|
| 3,860,952 A | 1/1975 | Tallent et al. | |
| 4,646,138 A | 2/1987 | Willis | |
| 5,097,321 A | 3/1992 | Stern et al. | |
| 5,121,207 A | 6/1992 | Herrmann | |
| 5,134,467 A | 7/1992 | Kim | |
| 5,142,377 A | 8/1992 | Moriyama et al. | |
| 5,231,478 A | 7/1993 | Fairhurst | |
| 5,260,839 A | 11/1993 | Matsuta et al. | |
| 5,327,228 A | 7/1994 | Satyanarayana et al. | |
| 5,345,276 A | 9/1994 | Hong | |
| 5,355,176 A | 10/1994 | Inagaki et al. | |
| 5,359,366 A | 10/1994 | Ubukata et al. | |
| 5,367,338 A | 11/1994 | Rothermel et al. | |
| 5,394,193 A | 2/1995 | Kim | |
| 5,418,818 A | 5/1995 | Marchetto et al. | |
| 5,506,932 A | 4/1996 | Holmes et al. | |
| 5,525,984 A | 6/1996 | Bunker | |
| 5,526,129 A | 6/1996 | Ko | |
| 5,581,305 A | 12/1996 | Min | |
| 5,600,379 A | 2/1997 | Wagner | |
| 5,654,770 A | 8/1997 | Hatano et al. | |
| 5,659,370 A | 8/1997 | Mancusco et al. | |
| 5,680,179 A | 10/1997 | D'Alto et al. | |
| 5,686,972 A | 11/1997 | Kim | |

(Continued)

FOREIGN PATENT DOCUMENTS

| | | |
|---|---|---|
| EP | 0449501 | 10/1991 |
| EP | 0549375 | 6/1993 |

*Primary Examiner*—Victor R Kostak
(74) *Attorney, Agent, or Firm*—Marger Johnson & McCollom, P.C.

(57) ABSTRACT

We describe and claim a fuzzy logic based adaptive Y/C separation system and method. The fuzzy logic based adaptive Y/C separation system includes an adaptive Y/C separator to use fuzzy logic to separate chrominance data in a video signal, and a panel to display the chrominance data. The adaptive Y/C separator includes a plurality of filters, each to separate chrominance data in a video signal, and a blending circuit to use fuzzy logic to blend the chrominance data.

14 Claims, 8 Drawing Sheets

U.S. PATENT DOCUMENTS

| | | | |
|---|---|---|---|
| 5,710,729 A | 1/1998 | Feste et al. | |
| 5,748,842 A | 5/1998 | Holmes et al. | |
| 5,892,847 A * | 4/1999 | Johnson | 382/232 |
| 5,909,255 A | 6/1999 | Hatano | |
| 5,940,138 A | 8/1999 | Lowe | |
| 5,953,071 A | 9/1999 | Van Zon | |
| 5,963,268 A | 10/1999 | Ko | |
| 5,990,978 A | 11/1999 | Kim et al. | |
| 6,052,748 A | 4/2000 | Suominen et al. | |
| 6,173,003 B1 | 1/2001 | Whikehart et al. | |
| 6,175,389 B1 | 1/2001 | Felts, III et al. | |
| 6,208,671 B1 | 3/2001 | Paulos et al. | |
| 6,297,849 B1 | 10/2001 | Stessen et al. | |
| 6,300,985 B1 | 10/2001 | Lowe | |
| 6,459,457 B1 | 10/2002 | Renner et al. | |
| 6,462,790 B1 | 10/2002 | Lowe et al. | |
| 6,571,224 B1 | 5/2003 | He et al. | |
| 6,581,164 B1 | 6/2003 | Felts, III et al. | |
| 6,614,474 B1 | 9/2003 | Malkin et al. | |
| 6,674,488 B1 | 1/2004 | Satoh | |
| 6,714,717 B1 | 3/2004 | Lowe et al. | |
| 6,744,472 B1 | 6/2004 | Macinnis et al. | |
| 6,774,954 B1 | 8/2004 | Lee | |
| 6,795,001 B2 | 9/2004 | Roza | |
| 6,795,126 B1 | 9/2004 | Lee | |
| 6,804,697 B2 | 10/2004 | Bugeja et al. | |
| 6,956,620 B2 | 10/2005 | Na | |
| 7,102,692 B1 | 9/2006 | Carisgaard et al. | |
| 7,304,688 B1 * | 12/2007 | Woodall | 348/663 |
| 7,420,625 B1 * | 9/2008 | Woodall | 348/668 |
| 7,532,254 B1 * | 5/2009 | Woodall | 348/609 |

* cited by examiner

FUZZY LOGIC BASED ADAPTIVE Y/C SEPARATION SYSTEM AND METHOD

This application is a continuation of and claims priority from U.S. patent application Ser. No. 11/031,310, filed Jan. 5, 2005, which issued as U.S. Pat. No. 7,420,625 on Sep. 2, 2008 and is a continuation-in-part of and claims priority from U.S. patent application Ser. No. 10/833,979, filed Apr. 27, 2004, which issued as U.S. Pat. No. 7,304,688 on Dec. 4, 2007 and claims priority from U.S. Provisional Application No. 60/472,280, filed May 20, 2003, all of which are hereby incorporated by reference in their entirety.

FIELD OF THE INVENTION

This invention relates generally to image processing and, more specifically, to a fuzzy logic based adaptive Y/C separation system and method.

BACKGROUND OF THE INVENTION

Composite video signals, commonly used in video broadcasts or transmissions, contain a brightness signal (luminance, luma or Y) and a color signal (chrominance, chroma or C), where the color signal is modulated into a color sub-carrier and added to the brightness signal prior to transmission. To effectuate demodulation of the color sub-carrier upon reception, receivers for color displays include a Y/C separator to separate luminance and chrominance components from the composite video signal.

Y/C separation is typically performed with either a notch/band pass filter combination or comb filters, where each filter separates portions of a composite video signal more effectively. For instance, a band pass filter used in conjunction with a notch or comb filter can separate the chrominance component from a composite signal. However, in addition to passing the chrominance signal, a notch/band-pass filter will pass high frequency luminance energy in the chrominance pass band. Therefore, some luminance appears as cross-color in a displayed picture. For instance, a vertical striped pattern on a displayed article of clothing can have a spatial frequency creating a high frequency luminance component, which appears as cross-color in a separated chrominance signal. This cross-color usually appears in a video picture as a colored rainbow superimposed on the reduced-amplitude striped pattern.

Although the notch/band pass filter combination has drawbacks, it is useful under certain conditions. For example, the filter combination is effective in picture regions lacking high luminance frequencies in the horizontal direction while containing high frequency chroma information in the vertical direction. In these regions, the comb filter described below degrades pictures with cross luma.

Comb filtering is another technique for Y/C separation. Comb filtering usually provides a considerably better component separation compared to the above-described notch/band-pass filter combination. Although conventional comb filters provide improved separation, crosstalk between the chrominance and luminance still occurs. Comb filters are therefore most effective in pictures having a flat field of color or high luminance frequencies in the horizontal direction. When spatial discontinuities in the vertical direction occur in a video picture, however, a conventional comb filter may inadequately separate chrominance and luminance components, causing undesirable artifacts in the displayed picture.

To optimize Y/C separation, many Y/C separators implement both separation techniques and adapt between the techniques responsive to the horizontal and vertical transitions of the video signal. Many approaches for adapting between the separation techniques exist. For instance, an adaptive Y/C separator may select between the outputs of the notch/band pass combination or the comb filters. When neither separation technique is optimal, however, the selection of either technique results in an undesirable picture quality. To counter this picture quality degradation adaptive Y/C separators blend the outputs of notch/band pass combination or the comb filters. Blending is typically implemented by generating a blending coefficient and combining the outputs of notch/band pass combination or the comb filters responsive to the blending coefficient. Each blending coefficient, however, is difficult to normalize, which causes the adaptive Y/C separator to not adapt when low chroma levels are present and to transition too quickly for high chroma levels.

Accordingly, there exists a need for an improved adaptive Y/C separation system and method that adapts to changes in a video signal without degrading the picture quality.

BRIEF DESCRIPTION OF THE DRAWINGS

The foregoing and other objects, features, and advantages of the invention will become more readily apparent from the following detailed description of a preferred embodiment that proceeds with reference to the following drawings.

DESCRIPTION OF THE INVENTION

Figure 1:
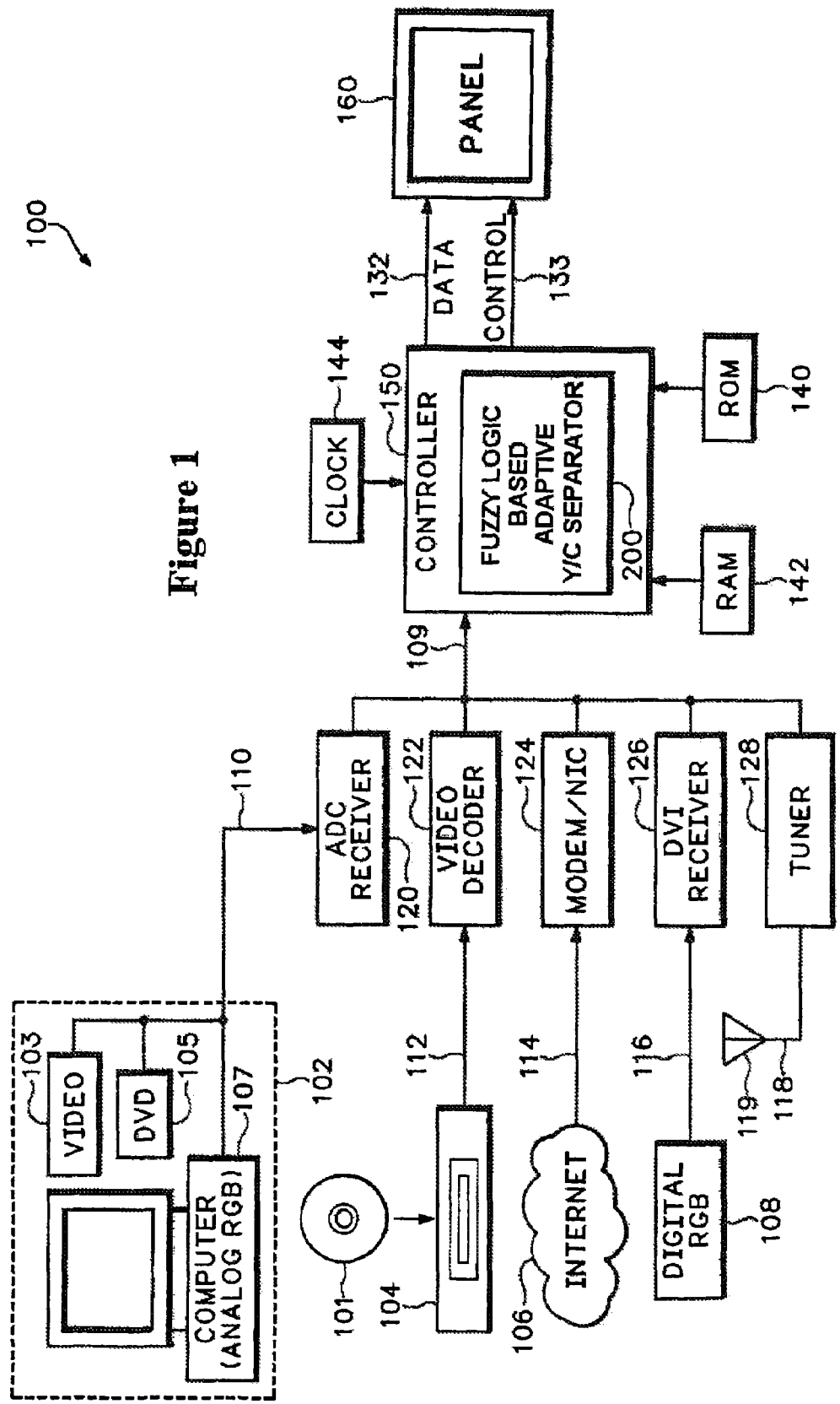
FIG. 1 is a block diagram of a display system.

FIG. 1 is a block diagram of an edge enhancement system 100. Referring to FIG. 1, the system 100 includes a receiver 120 for receiving an analog image data signal 110, e.g., RGB or $YP_BP_R$ signal, from a source 102. The source 102 may be a personal computer 107, a digital video disk player 105, set top box (STB) 103, or any other device capable of generating the analog image data signal 110. The receiver 120 may be an analog-to-digital converter (ADC) or any other device capable of generating digital video signal 109 from the analog image data 110. The receiver 120 converts the analog image data signal 110 into the digital image data 109 and provides it to a controller 150. A person of reasonable skill in the art knows well the design and operation of the source 102 and the receiver 120.

Likewise, a video receiver or decoder 122 decodes an analog video signal 112 from a video source 104. The video source 104 may be a video camcorder, tape player, digital video disk (DVD) player, or any other device capable of generating the analog video signal 112. The video source 104 may read (or play) external media 101. In an embodiment, a DVD player 104 plays the DVD 101. In another embodiment, a VHS tape player 104 plays a VHS tape 101. The decoder 122 converts the analog video signal 112 into the digital video signal 109 and provides it to the panel controller 150. The decoder 122 is any device capable of generating digital video signal 109, e.g., in Y/C or CVBS format, from the analog video signal 112. A person of reasonable skill in the art knows well the design and operation of the video source 104 and the video decoder 112.

A modem or network interface card (NIC) 124 receives data 114 from a global computer network 106 such as the Internet®. The data 114 may be in any format capable of transmission over the network 106. In an embodiment, the data 114 is packetized digital data. But the data 114 may also be in an analog form. Likewise, the modem 124 may be a digital or analog modem or any device capable of receiving data 114 from a network 106. The modem 124 provides digital video signal 109 to the panel controller 150. A person of reasonable skill in the art knows well the design and operation of the network 106 and the modem/NIC 124.

A Digital Visual Interface (DVI) or high definition multimedia interface (HDMI) receiver 126 receives digital signals 116 from a digital source 108. In an embodiment, the source 108 provides digital RGB signals 116 to the receiver 126. The receiver 126 provides digital video signal 109 to the panel controller 150. A person of reasonable skill in the art knows well the design and operation of the source 108 and the receiver 126.

A tuner 128 receives a wireless signal 118 transmitted by the antenna 119. The antenna 119 is any device capable of wirelessly transmitting or broadcasting the signal 118 to the tuner 128. In an embodiment, the antenna 119 transmits a television signal 118 to the television tuner 128. The tuner 128 may be any device capable of receiving a signal 118 transmitted wirelessly by any other device, e.g., the antenna 119, and of generating the digital video signal 109 from the wireless signal 118. The tuner 128 provides the digital video signal 109 to the controller 150. A person of reasonable skill in the art knows well the design and operation of the antenna 119 and the tuner 128.

The digital video signal 109 may be in a variety of formats, including composite or component video. Composite video describes a signal in which luminance, chrominance, and synchronization information are multiplexed in the frequency, time, and amplitude domain for single wire transmission. Component video, on the other hand, describes a system in which a color picture is represented by a number of video signals, each of which carries a component of the total video information. In a component video device, the component video signals are processed separately and, ideally, encoding into a composite video signal occurs only once, prior to transmission. The digital video signal 109 may be a stream of digital numbers describing a continuous analog video waveform in either composite or component form. FIG. 1 describes a variety of devices (and manners) in which the digital video signal 109 may be generated from an analog video signal or other sources. A person of reasonable skill in the art should recognize other devices for generating the digital video signal 109 come within the scope of the present invention.

The controller 150 generates image data 132 and control signals 133 by manipulating the digital video signal 109. The panel controller 150 provides the image data 132 and control signals 133 to a panel device 160. The panel 160 includes a pixelated display that has a fixed pixel structure. Examples of pixelated displays are active and passive LCD displays, plasma displays (PDP), field emissive displays (FED), electro-luminescent (EL) displays, micro-mirror technology displays, low temperature polysilicon (LTPS) displays, and the like. A person of reasonable skill in the art should recognize that flat panel 160 may be a television, monitor, projector, personal digital assistant, and other like applications.

The controller 150 includes a fuzzy logic based adaptive Y/C separator 200 for separating the luminance and chrominance components of the digital video signal 109. Adaptive Y/C separator 200 may be integrated into a monolithic integrated circuit or hardwired using any number of discrete logic and other components. Alternatively, the controller 150 may be a dedicated processor system that includes a microcontroller or a microprocessor to implement the adaptive Y/C separator 200 as a software program or algorithm. We explain the adaptive Y/C separator 200 in more detail below.

In an embodiment, the controller 150 may scale the digital video signal 109 for display by the panel 160 using a variety of techniques including pixel replication, spatial and temporal interpolation, digital signal filtering and processing, and the like. In another embodiment, the controller 150 may additionally change the resolution of the digital video signal 109, changing the frame rate and/or pixel rate encoded in the digital video signal 109. Scaling, resolution, frame, and/or pixel rate conversion, and/or color manipulation are not central to this invention and are not discussed in further detail.

Read-only (ROM) and random access (RAM) memories 140 and 142, respectively, are coupled to the display system controller 150 and store bitmaps, FIR filter coefficients, and the like. A person of reasonable skill in the art should recognize that the ROM and RAM memories 140 and 142, respectively, may be of any type or size depending on the application, cost, and other system constraints. A person of reasonable skill in the art should recognize that the ROM and RAM memories 140 and 142, respectively, are optional in the system 100. A person of reasonable skill in the art should recognize that the ROM and RAM memories 140 and 142, respectively, may be external or internal to the controller 150. RAM memory 142 may be a flash type memory device. Clock 144 controls timing associated with various operations of the controller 150.

Figure 2:
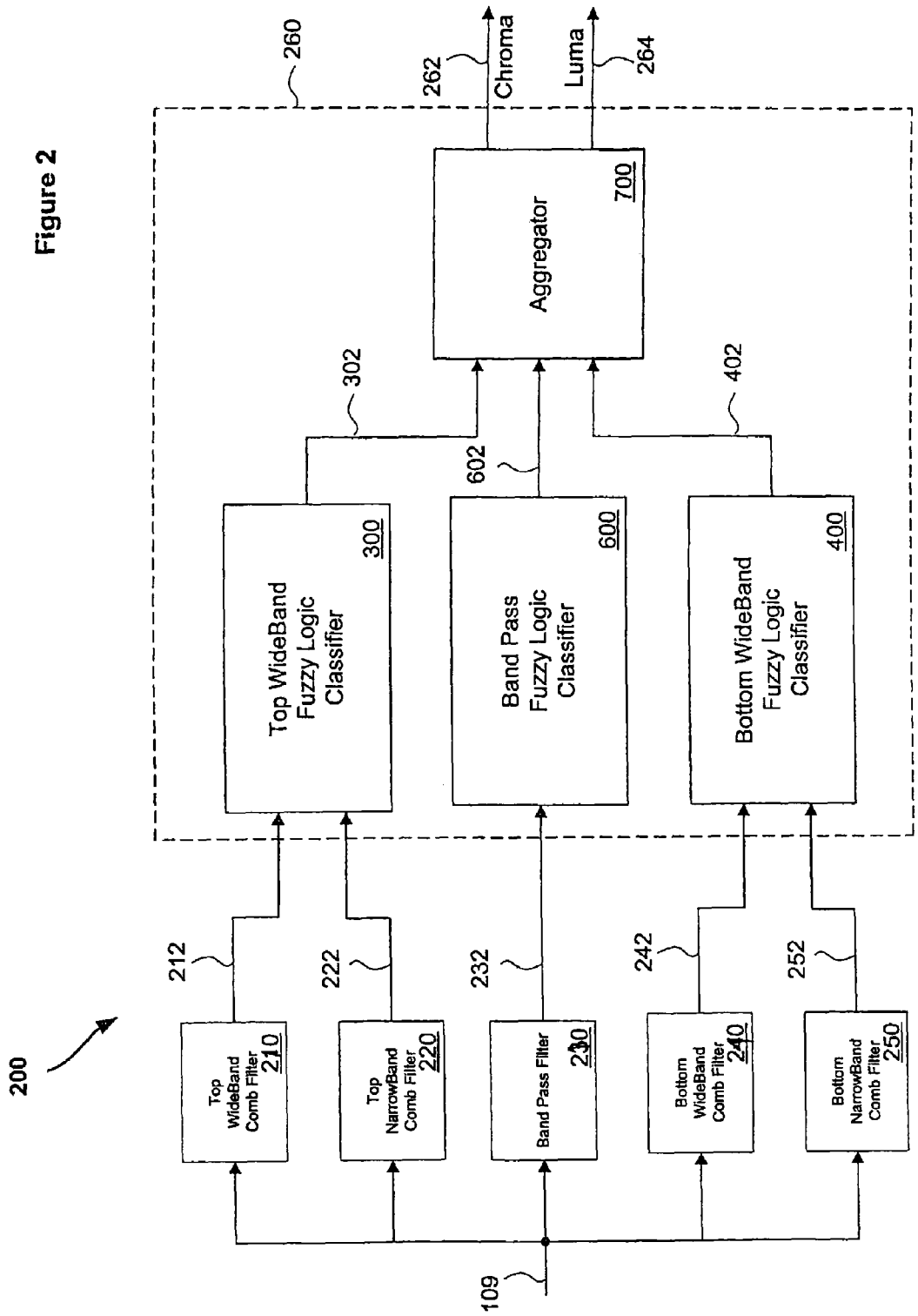
FIG. 2 is a block diagram of an embodiment of the fuzzy logic based adaptive Y/C separator shown in FIG. 1.

An embodiment of the fuzzy logic based adaptive Y/C separator 200 will be explained with reference to FIGS. 2-8. FIG. 2 is a block diagram of an embodiment of the fuzzy logic based adaptive Y/C separator 200 shown in FIG. 1. Referring to FIG. 2, fuzzy logic based adaptive Y/C separator 200 includes a narrowband comb filter, shown in FIG. 2 as a top narrowband comb filter 220 and a bottom narrowband comb filter 250, to separate luminance and chrominance components of digital video signal 109, and provide the chrominance components 222 and 252 to a fuzzy blending circuit 260. The chrominance components 222 and 252 from top and bottom narrow band comb filters 220 and 250, respectively, may be averaged to implement a baseline narrow band comb filter used when other specialized separators provide undesirable results. The narrowband comb filter may be implemented as a $2^{nd}$ order band pass filter. The narrowband comb filter may be a 3-line NTSC or 5-line PAL separator, where a top narrowband comb filter 220 may use the middle and top lines (lines 1 and 2 for NTSC, lines 1 and 3 for PAL), while a bottom narrowband comb filter 250 may use the middle and bottom lines (lines 2 and 3 for NTSC, lines 3 and 5 for PAL). The comb filters 220 and 250 may have any implementation known to a person of reasonable skill in the art.

Fuzzy logic based adaptive Y/C separator 200 includes a top wideband comb filter 210 and a bottom wideband comb filter 240, where each filter separates luminance and chrominance components of digital video signal 109, and provides the chrominance components 212 and 242 to a fuzzy blending circuit 260. The top and bottom wideband comb filter 210 and 240 may be separators that may be applied when the application of the baseline narrow band comb filter degrades the picture quality, e.g., when horizontal chroma transitions outside of the color sub-carrier frequency band are present. The wideband comb filter may be a 3-line NTSC or 5-line PAL separator where the top wideband comb filter 210 may use the middle and top lines (lines 1 and 2 for NTSC, lines 1 and 3 for PAL), while the bottom wideband comb filter 240 may use the middle and bottom lines (lines 2 and 3 for NTSC, lines 3 and 5 for PAL). The comb filters 210 and 240 may be any kind of comb filters known to a person of reasonable skill in the art.

Fuzzy logic based adaptive Y/C separator 200 includes a band pass filter 230 to separate luminance and chrominance components of digital video signal 109 and provide chrominance component 232 to fuzzy blending circuit 260. The band pass filter 230 may be a separator that may be applied when the application of comb filters degrades the picture quality, e.g., when vertical chroma transitions are present. The band pass filter 230 may be any kind of band pass filter known to a person of reasonable skill in the art.

A fuzzy blending circuit 260 receives chrominance components 212, 222, 232, 242, and 252 from filters 210, 220, 230, 240, and 250, respectively, and produces a chroma output 262 and a luma output 264 responsive to the reception. The chroma output 262 may be a selection of one of the chrominance components 212, 232, 242 or the average of chrominance components 222 and 252, or a blending of any combination of the chrominance components 212, 232, or 242. The chrominance components 212, 232, and 242, as discussed below in more detail, may be adjusted prior to selection. The chroma output 262 and the luma output 264 represent the optimal separation of the chrominance and the luminance components of digital video signal 109 by fuzzy logic based adaptive Y/C separator 200.

Fuzzy blending circuit 260 includes a top wideband fuzzy logic classifier 300, bottom wideband fuzzy logic classifier 400, and a band pass fuzzy logic classifier 600. Top wideband fuzzy logic classifier 300 receives chrominance components 212 and 222 from filters 210 and 220, respectively. Classifier 300 adjusts chrominance components 212 and 222 and provides an adjusted top wideband component 302 to an aggregator 700. Classifier 300 may adjust chrominance components 212 and 222 to indicate a level of congruency with a top wideband fuzzy set, where the top wideband fuzzy logic set corresponds to the video signals best separated by classifier 300. Bottom wideband fuzzy logic classifier 400 receives chrominance components 242 and 252 from filters 240 and 250, respectively. Classifier 400 adjusts chrominance components 242 and 252 and provides an adjusted bottom wideband component 402 to the aggregator 700. Classifier 400 may adjust chrominance components 242 and 252 to indicate a level of congruency with a bottom wideband fuzzy set, where the bottom wideband fuzzy logic set corresponds to the video signals best separated by classifier 400. Band pass fuzzy logic classifier 600 receives chrominance component 232 from filter 230. Classifier 600 adjusts chrominance component 232 and provides an adjusted band pass component 602 to the aggregator 700. Classifier 600 may adjust chrominance component 232 to indicate a level of congruency with a band pass fuzzy set, where the band pass fuzzy logic set corresponds to the video signals best separated by classifier 600.

The aggregator 700 determines the chroma output 262 and the luma output 264 responsive to adjusted components 302, 402, and 602, where the chroma output 262 and the luma output 264 are the optimal separation of the chrominance and the luminance components, respectively, of digital video signal 109 by fuzzy logic based adaptive Y/C separator 200. The aggregator provides the chroma output 262 and the luma output 264 to controller 150. The aggregator 700 may determine the optimal separation by selecting one of the adjusted components 302, 402, and 602, blending any combination of the adjusted components 302, 402, and 602, or selecting the baseline narrowband comb filter (the average of components 222 and 252).

Figure 3:
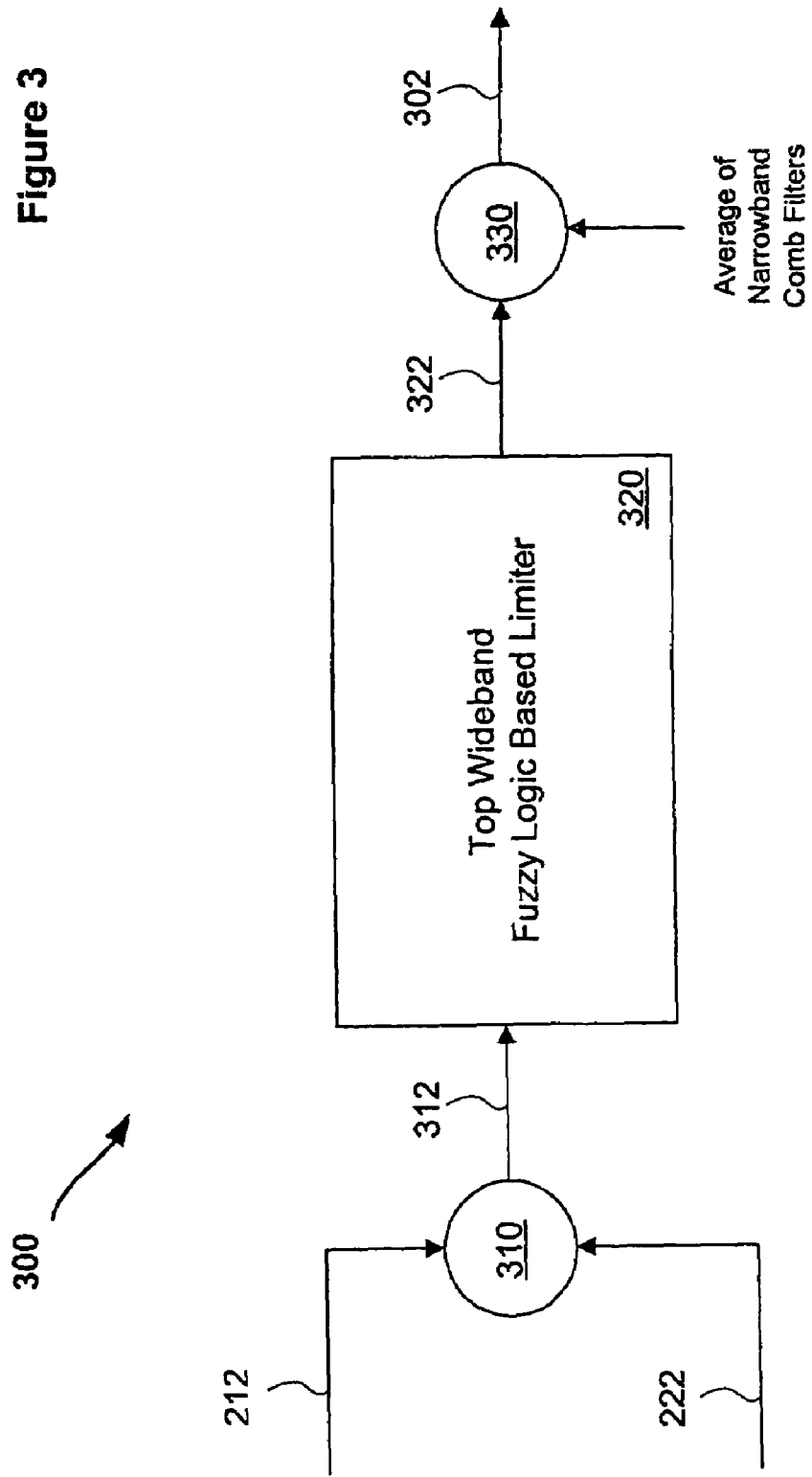
FIG. 3 is a block diagram of an embodiment of the top wideband fuzzy logic classifier shown in FIG. 2.

FIG. 3 is a block diagram of an embodiment of the top wideband fuzzy logic classifier 300 shown in FIG. 2. Referring to FIG. 3, top wideband fuzzy logic classifier 300 includes a difference block 310 to generate a difference 312 between chrominance component 212 from top wideband comb filter 210 and component 222 from top narrowband comb filter 220. The difference 312 may indicate horizontal chroma transitions outside of the color sub-carrier frequency band are present with respect to the top and middle lines.

A top wideband fuzzy logic based limiter 320 may adjust the difference 312 to indicate a congruency level with the top wideband fuzzy set. The top wideband fuzzy set may represent those video signals best separated by the top wideband comb filter 210. In other words, the top wideband fuzzy logic based limiter 320 adjusts the difference 312 to indicate to the aggregator 700 how well the top wideband comb filter 210 separates the digital video signal 109. The adjustment of the difference 312 may assist aggregator 700 in determining the optimal separation of digital video signal 109.

The limiter 320 may adjust the difference 312 comparing the difference 312 with a top wideband indicator. In an embodiment, when the top wideband indicator is smaller than the difference 312, the difference 312 may be reduced or replaced by the top wideband indicator; otherwise the difference 312 is left unchanged. The top wideband indicator may include wideband comb filter leakage or horizontal transitions, diagonal features between the top, middle, and bottom lines, and narrowband comb filter leakage or horizontal transitions, where wideband leakage and diagonal features may decrease the indicator and the narrowband leakage may increase the indicator. A person of reasonable skill in the art knows well the detection of diagonal features in video signals.

Although not shown in FIG. 2 or 3, the Y/C separator 200 may include leakage detectors that detect leakage from a variety of sources including the filters 210, 22, 230, 240, and 250. The leakage detectors may be similar or of a different order than the filters 210, 220, 230, 240, and 250. For example, the leakage detectors may be of a lower order than the filters 210, 220, 230, 240, and/or 250.

The indicator may include a gain value for customizing the top wideband indicator, and thus the representation of the top wideband fuzzy set, to a user's specifications. The gain value may be a multiple of the indicator.

The top wideband fuzzy logic based limiter 320 may include a difference block 330 to generate the adjusted top wideband component 302 from the adjusted difference 322 and the average of the chrominance components 222 and 252 from the top and bottom narrowband comb filters, respectively. The adjusted top wideband component 302 is provided to an aggregator 700.

Figure 4:
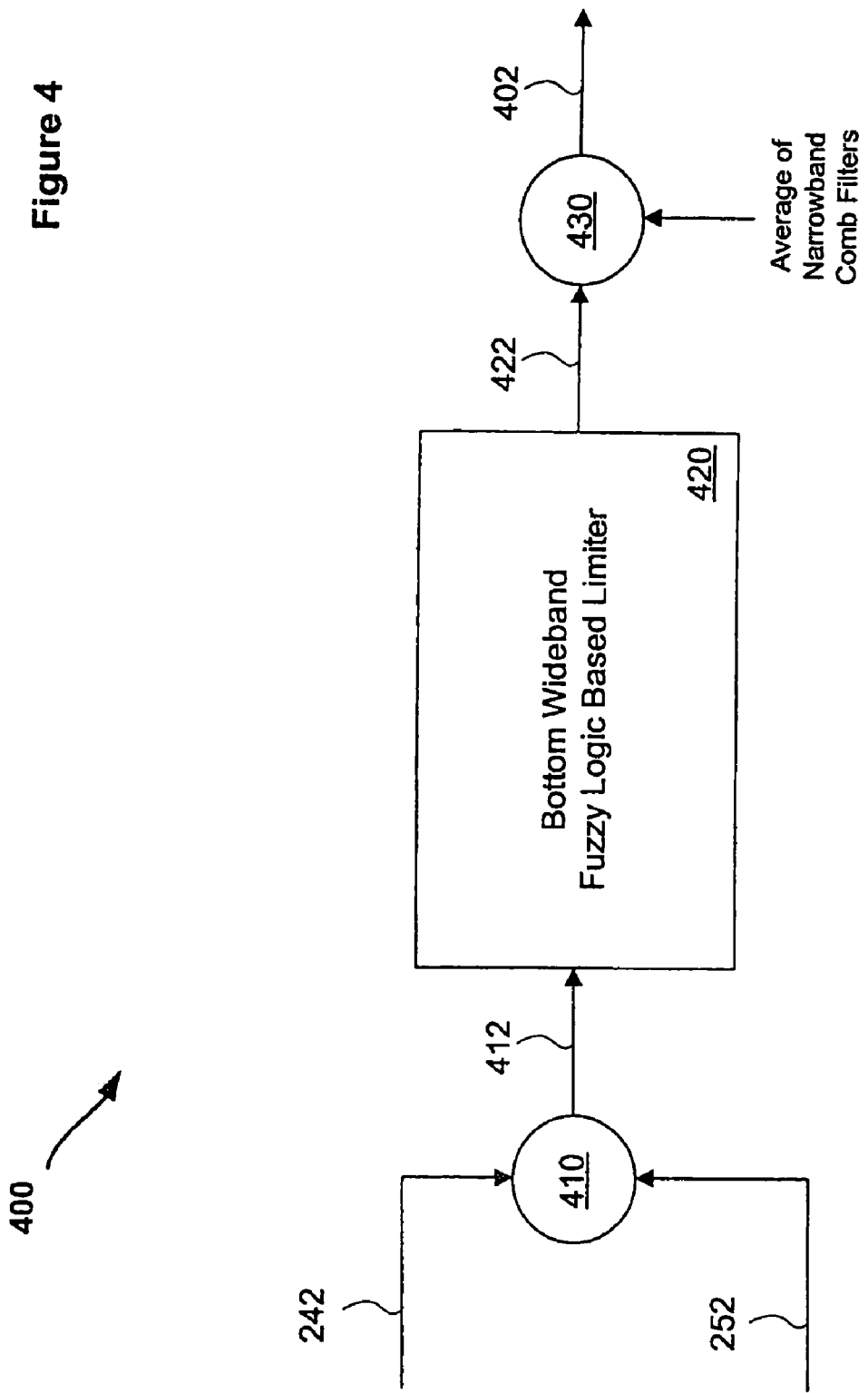
FIG. 4 is a block diagram of an embodiment of the bottom wideband fuzzy logic classifier shown in FIG. 2.

FIG. 4 is a block diagram of an embodiment of the bottom wideband fuzzy logic classifier shown in FIG. 2. Referring to FIG. 4, bottom wideband fuzzy logic classifier 400 includes a difference block 410 to generate a difference 412 between chrominance component 242 from bottom wideband comb filter 240 and chrominance component 252 from bottom narrowband comb filter 250. The difference 412 may indicate horizontal chroma transitions outside of the color sub-carrier frequency band are present with respect to the middle and bottom lines.

A bottom wideband fuzzy logic based limiter 420 adjusts the difference 412 to indicate a level of congruency with the bottom wideband fuzzy set. The bottom wideband fuzzy set may represent those video signals best separated by the bottom wideband comb filter 240. In other words, the bottom wideband fuzzy logic based limiter 420 adjusts the difference 412 to indicate to the aggregator 700 how well the bottom wideband comb filter 240 separates the digital video signal 109. The adjustment of the difference 412 may assist aggregator 700 in determining the optimal separation of digital video signal 109.

The limiter 420 may adjust the difference 412 comparing the difference 412 with a bottom wideband indicator. In an embodiment, when the bottom wideband indicator is smaller than the difference 412, the difference 412 may be reduced or replaced by the bottom wideband indicator; otherwise the difference 412 is left unchanged. The bottom wideband indicator may include wideband comb filter leakage or horizontal transitions, diagonal features between the top, middle, and bottom lines, and narrowband comb filter leakage or horizontal transitions, where wideband leakage and diagonal features may decrease the indicator and the narrowband leakage may increase the indicator. A person of reasonable skill in the art knows well the detection of diagonal features from wideband and narrowband comb filters. The limiter 420 may include a gain value for customizing the bottom wideband indicator, and thus the representation of the bottom wideband fuzzy set, to a user's specifications. In an embodiment, the gain value may be a multiple of the indicator. In another embodiment, the gain value for limiter 420 may be the same as the gain value for limiter 320.

The bottom wideband fuzzy logic based limiter 420 may include a difference block 430 to generate the adjusted bottom wideband component 402 from the adjusted difference 422 and the average of the chrominance components 222 and 252 from the top and bottom narrowband comb filters, respectively. The adjusted bottom wideband component 402 is provided to the aggregator 700.

Figure 5:
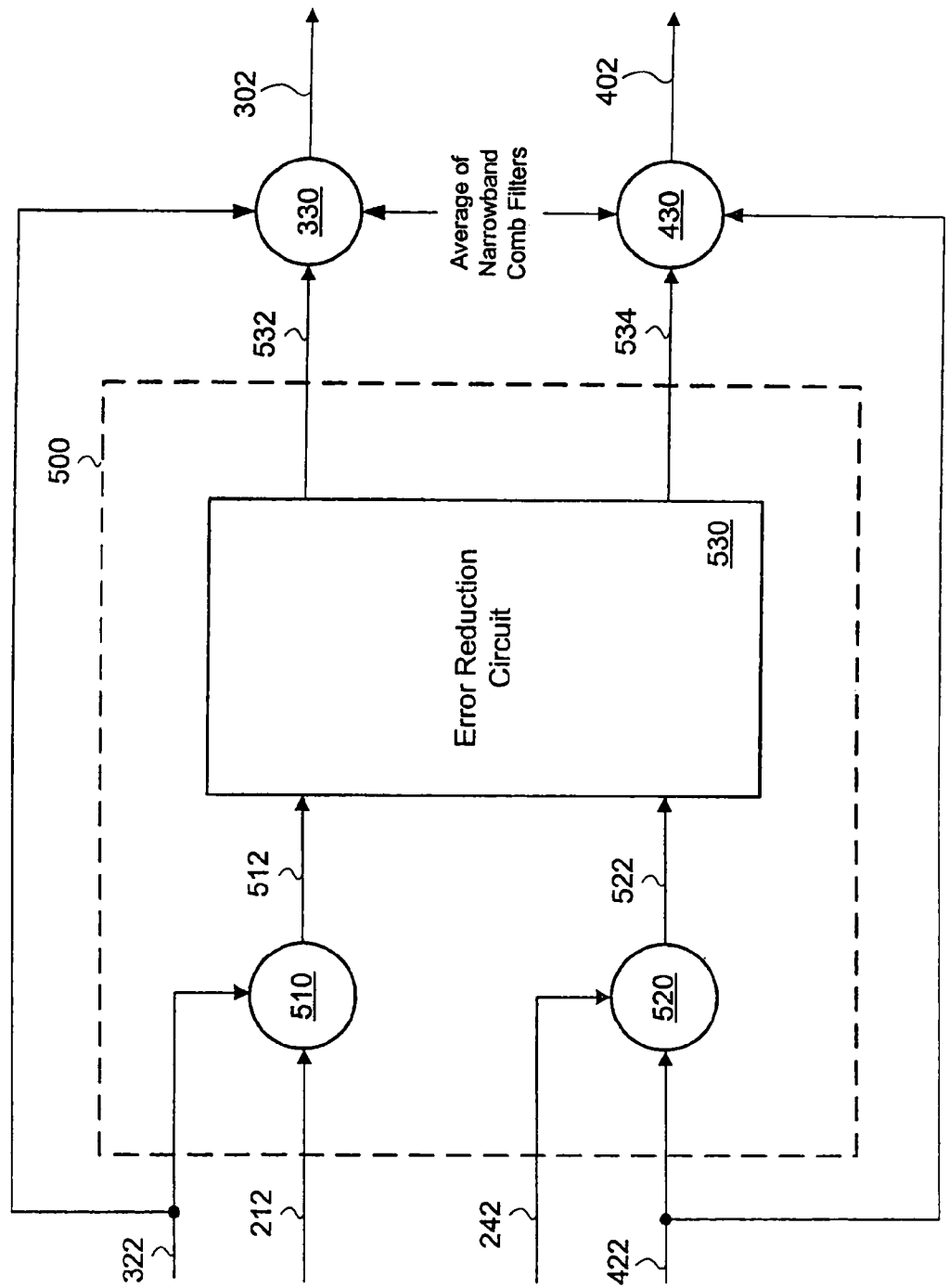
FIG. 5 is a block diagram of an embodiment of a comb error determiner.

FIG. 5 is a block diagram of an embodiment of a comb error determiner 500. Referring to FIG. 5, the comb error determiner 500 determines top and bottom adjusted errors 532 and 534 which may be used to adjust the adjusted top and bottom wideband components 302 and 402, respectfully. In other words, the comb error determiner 500 may adjust components 302 and 402 to indicate how well the top and bottom wideband comb filter 210 and 240 separate the digital video signal 109, respectively. The adjustment of components 302 and 402 with top and bottom adjusted errors 532 and 534 may assist aggregator 700 in determining the optimal separation of digital video signal 109. Although the comb error determiner 500 is shown as an independent block, comb error determiner 500 may be divided between top and bottom wideband fuzzy logic classifier 300 and 400.

The comb error determiner 500 includes a difference block 510 to generate a top error 512 from the difference between chrominance component 212 from top wideband comb filter 210 and adjusted difference 322, and a difference block 520 to generate a bottom error 522 from the difference between chrominance component 242 from bottom wideband comb filter 240 and adjusted difference 422. An error reduction circuit 530 generates top and bottom adjusted errors 532 and 534 responsive to top and bottom errors 512 and 522, and provides the top and bottom adjusted errors 532 and 534 to difference blocks 330 and 430, respectively. The top and bottom adjusted errors 532 and 534 may be generated by adjusting top and bottom errors 512 and 522, respectively, where each adjustment may be predetermined and/or programmable. In an embodiment, error reduction circuit 530 may reduce the smaller of the top and bottom errors 512 and 522 to zero or to a vertical chroma slope, and may reduce the magnitude other error by same amount. The vertical chroma slope may be determined as the difference between chrominance components 222 and 252. In other embodiments, the error reduction circuit 530 may increase the top adjusted error 532 by the difference in chrominance components 222 and 232, and may increase the bottom adjusted error 534 by the difference in chrominance components 232 and 242.

Difference block 330 may generate the adjusted top wideband component 302 from the adjusted difference 322, the top adjusted error 532, and the average of the chrominance components 222 and 252 from the top and bottom narrowband comb filters, respectively. Difference block 430 may generate the adjusted bottom wideband component 402 from the adjusted difference 422, the bottom adjusted error 534, and the average of the chrominance components 222 and 252 from the top and bottom narrowband comb filters, respectively.

Figure 6:
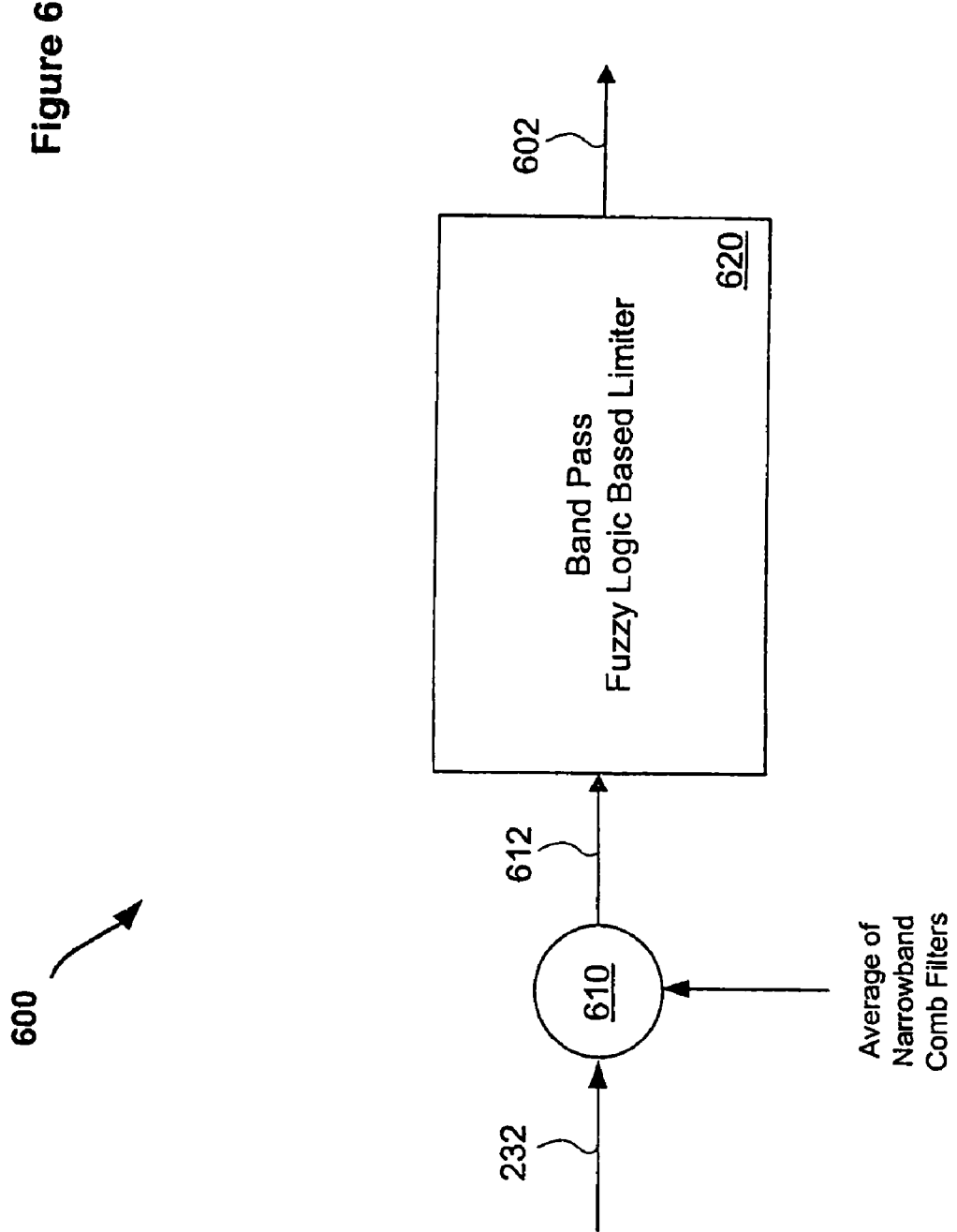
FIG. 6 is a block diagram of an embodiment of the band pass fuzzy logic classifier shown in FIG. 2.

FIG. 6 is a block diagram of an embodiment of the band pass fuzzy logic classifier shown in FIG. 2. Referring to FIG. 6, band pass fuzzy logic classifier 600 includes a difference block 410 to generate a difference 612 between chrominance component 232 from band pass comb filter 230 and the average of the chrominance components 222 and 252 from the top and bottom narrowband comb filters 220 and 250, respectively.

A band pass fuzzy logic based limiter 620 generates an adjusted band pass component 602 responsive to the difference 612 and provides the adjusted band pass component 602 to the aggregator 700. The adjusted band pass component 602 may indicate a level of congruency with the band pass fuzzy set. The band pass fuzzy set may represent those video signals best separated by the band pass filter 230. In other words, the band pass fuzzy logic based limiter 620 adjusts the difference 612 to indicate to the aggregator 700 how well the band pass filter 230 separates the digital video signal 109. The adjustment of the difference 612 may assist aggregator 700 in determining the optimal separation of digital video signal 109.

The limiter 620 may adjust the difference 612 comparing the difference 612 with a band pass indicator. In an embodiment, when the band pass indicator is smaller than the difference 612, the difference 612 may be reduced or replaced by the band pass indicator; otherwise the difference 612 is left unchanged. The band pass indicator may include vertical chroma changes, top and bottom comb filter leakages or horizontal transitions, band pass filter leakages and diagonal features between the top, middle, and bottom lines. The vertical chroma changes and the top and bottom comb filter leakages may increase the difference 612. The band pass filter leakages and diagonal features may decrease the difference 612. A person of reasonable skill in the art knows well the detection of diagonal features from wideband and narrowband comb filters and band pass filter, and vertical chroma changes. The limiter 620 may include at least one gain value for customizing the band pass indicator, and thus the representation of the band pass fuzzy set, to a user's specifications. In an embodiment, the gain value may be adjusted to control the use of the leakages, the vertical chroma changes, and the diagonal features.

Figure 7:
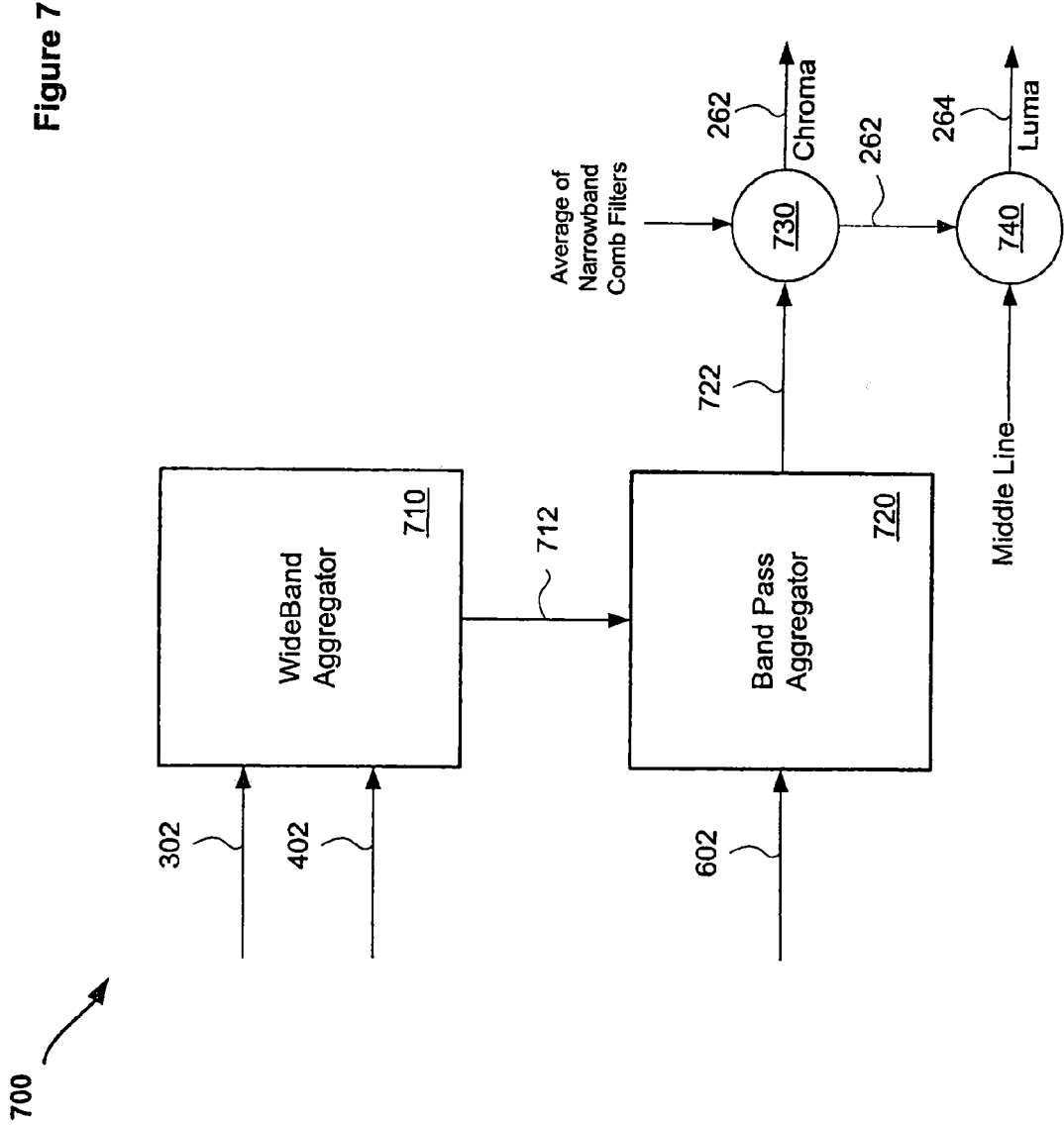
FIG. 7 is a block diagram of an embodiment of the aggregator shown in FIG. 2.

FIG. 7 is a block diagram of an embodiment of the aggregator shown in FIG. 2. Referring to FIG. 7, the aggregator 700 includes a wideband aggregator 710 to aggregate the adjusted top and bottom wideband components 302 and 402, and provide the results 712 to a band pass aggregator 720. The wideband aggregator 710 may select a component 302 or 402 when they reinforce each other, or blend the components 302 and 402 when they are divergent. The divergence of components 302 and 402 may indicate that vertical chroma transitions are present, and possibly that neither wideband comb filter 210 or 240 may be optimal for the separation of digital video signal 109. Blending the components 302 and 402 may comprise adding the components 302 and 402 when they have opposite signs. Selecting a component 302 or 402 may comprise selecting the component with the greatest magnitude.

The band pass aggregator 720 aggregates the result 712 of the wideband aggregator 710 with the adjusted band pass component 602, and provides the result 722 to a summation block 730. The band pass aggregator 720 may select a component 712 or 602 when they reinforce each other, or blend the components 712 and 602 when they are divergent. The divergence of components 712 and 602 may indicate that vertical chroma transitions and/or horizontal luma and/or chroma transitions are present, and possibly that none of the separators may be optimal for the separation of digital video signal 109. Blending the components 712 and 602 may comprise adding the components 712 and 602 when they have opposite signs. Selecting a component 712 and 602 may comprise selecting the component with the greatest magnitude.

Since the result 722 of the band pass aggregation is a difference value, as each input to aggregator 700 has been reduced by the average of the chrominance components 222 and 252, the summation block 730 adds the result 722 of the band pass aggregation to the average of the chrominance components 222 and 252 to generate the chroma output 262. Thus when the result 722 of the band pass aggregation is approximately zero, the baseline narrowband comb filter (the average of the chrominance components 222 and 252) is the de facto selection by the aggregator 700. A summation block 740 generates the luma output 264 from the chroma output 264 and the middle line of the digital video signal 109. This generation of the luma output 264 with the chroma output 262 and the middle line is well known in the art.

Figure 8:
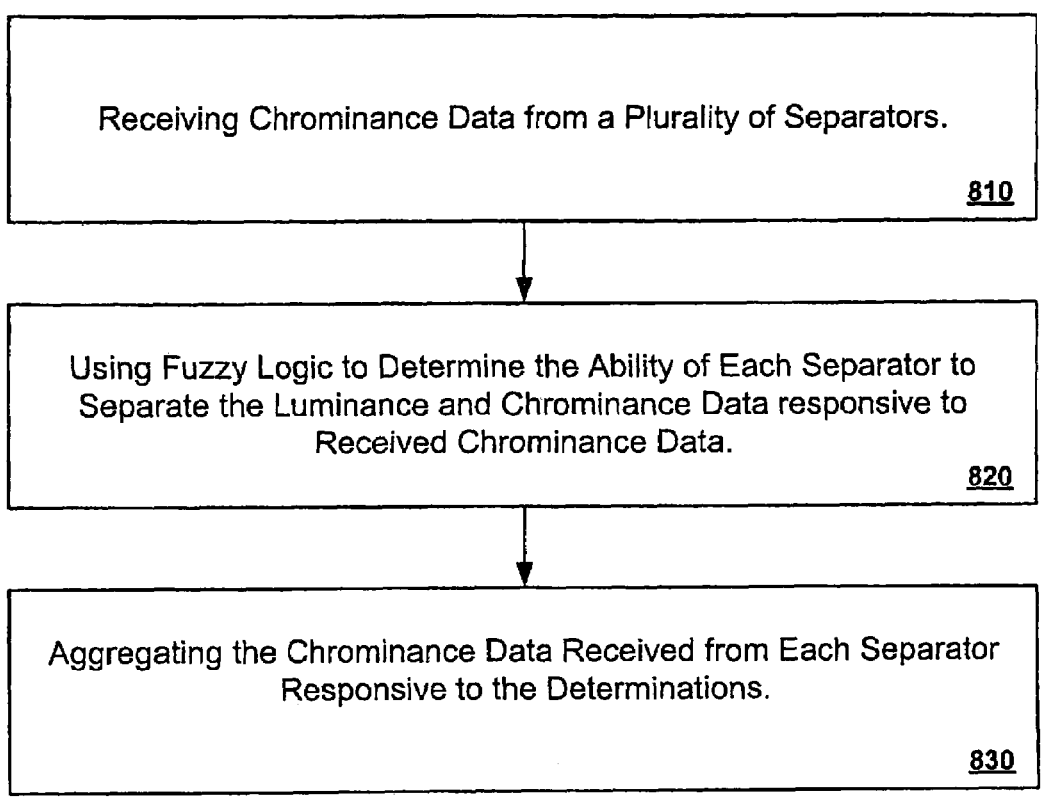
FIG. 8 is a flowchart of an embodiment of a method for fuzzy logic based adaptive Y/C separation.

FIG. 8 is a flowchart of an embodiment of a method for fuzzy logic based adaptive Y/C separation. Referring to FIG. 8, according to a block 810, fuzzy blending circuit 260 receives chrominance data from a plurality of separators, where each separator separates luminance and chrominance data in digital video signal 109. According to a next block 820, fuzzy blending circuit 260 uses fuzzy logic to determine the ability of each separator to separate the luminance and chrominance data responsive to received chrominance data. According to a next block 830, fuzzy blending circuit 260 aggregates the chrominance data received from each separator responsive to the determinations.

Having illustrated and described the principles of our invention, it should be readily apparent to those skilled in the art that the invention may be modified in arrangement and detail without departing from such principles. I claim all modifications coming within the spirit and scope of the accompanying claims.

I claim:

1. An apparatus, comprising:
  a plurality of filters each to separate chrominance data in a video signal, wherein the plurality of filters comprises a top wide band comb filter and a top narrow band comb filter, each to separate luminescence and chrominance components of the video signal and to provide the chrominance components to the blending circuit; and
  a blending circuit to use fuzzy logic to blend the chrominance data, wherein the blending circuit comprises:
    a plurality of fuzzy logic classifiers, each classifier to manipulate chrominance data from a corresponding subset of the plurality of filters; and
    an aggregator to blend the chrominance data from the fuzzy logic classifiers.

2. The apparatus of claim 1, wherein the plurality of fuzzy logic classifiers comprises a top wide band fuzzy logic classifier to receive the chrominance components provided by the top wide band comb filter and the top narrow band comb filter and, responsive to the chrominance components received from the top wide band comb filter and the top narrow band comb filter, to provide an adjusted top wide band component to the aggregator.

3. The apparatus of claim 2, wherein the plurality of filters further comprises a bottom wide band comb filter and a bottom narrow band comb filter, each to separate luminescence and chrominance components of the video signal and to provide the chrominance components to the blending circuit.

4. The apparatus of claim 3, wherein the plurality of fuzzy logic classifiers further comprises a bottom wide band fuzzy logic classifier to receive the chrominance components provided by the bottom wide band comb filter and the bottom narrow band comb filter and, responsive to the chrominance components received from the bottom wide band comb filter and the bottom narrow band comb filter, to provide an adjusted bottom wide band component to the aggregator.

5. The apparatus of claim 4, wherein the plurality of filters further comprises a band pass filter to separate luminescence and chrominance components of the video signal and to provide the chrominance components to the blending circuit.

6. The apparatus of claim 5, wherein the plurality of fuzzy logic classifiers further comprises a band pass fuzzy logic classifier to receive the chrominance components provided by the band pass filter and, responsive to the chrominance components received from the band pass filter, to provide an adjusted band pass component to the aggregator.

7. The apparatus of claim 2, wherein the top wide band fuzzy logic classifier comprises a difference block to generate a difference between a chrominance component provided by the top wide band comb filter and a chrominance component provided by the top narrow band comb filter.

8. The apparatus of claim 7, wherein the top wide band fuzzy logic classifier further comprises a limiter to adjust the difference to indicate a congruency level.

9. The apparatus of claim 4, wherein the bottom wide band fuzzy logic classifier comprises a difference block to generate a difference between a chrominance component provided by the bottom wide band comb filter and a chrominance component provided by the bottom narrow band comb filter.

10. The apparatus of claim 9, wherein the bottom wide band fuzzy logic classifier further comprises a limiter to adjust the difference to indicate a congruency level.

11. The apparatus of claim 1, wherein the blending circuit produces a chroma output and a luma output responsive to the chrominance data.

12. The apparatus of claim 11, wherein the chroma output comprises a selection of a chrominance component from the chrominance data.

13. The apparatus of claim 1, further comprising a controller to receive the blended chrominance data from the aggregator.

14. The apparatus of claim 1,
wherein the blending circuit is adapted to determine the suitability of each filter to separate the chrominance data, and
wherein the blending circuit is adapted to blend the chrominance data responsive to the determination.

* * * * *